A. P. SCOTT.
MANUFACTURE OF ELECTRODES.
APPLICATION FILED NOV. 17, 1915.

1,226,121.

Patented May 15, 1917.
2 SHEETS—SHEET 1.

Inventor
Arthur P. Scott
By his Attorneys
Pennie Davis & Marvin

A. P. SCOTT.
MANUFACTURE OF ELECTRODES.
APPLICATION FILED NOV. 17, 1915.

1,226,121.

Patented May 15, 1917.
2 SHEETS—SHEET 2.

Arthur P. Scott, Inventor
By his Attorneys
Pennie Davis Marvin

UNITED STATES PATENT OFFICE.

ARTHUR P. SCOTT, OF CHICAGO, ILLINOIS, ASSIGNOR TO CHILE EXPLORATION COMPANY, OF NEW YORK, N. Y., A CORPORATION OF NEW JERSEY.

MANUFACTURE OF ELECTRODES.

1,226,121.         Specification of Letters Patent.      Patented May 15, 1917.

Application filed November 17, 1915. Serial No. 61,904.

*To all whom it may concern:*

Be it known that I, ARTHUR P. SCOTT, a subject of the King of Great Britain, residing at Chicago, county of Cook, and State of Illinois, have invented certain new and useful Improvements in Manufacture of Electrodes; and I do hereby declare the following to be a full, clear, and exact description of the invention, such as will enable others skilled in the art to which it appertains to make and use the same.

This invention relates to the manufacture of magnetite electrodes, and particularly of hollow magnetite anodes, by a casting operation.

In practising the invention, the molten magnetite, from which the electrodes are to be cast, is first produced in a suitable type of electric furnace, such as a single phase alternating current furnace of the direct arc type. The bottom of the furnace is provided with a protective conducting layer of the magnetite. Such a protective layer, above the bottom steel electrode, is prepared from the ore ("purple ore" or leached Rio Tinto cinder) by melting the same and allowing the molten magnetite to set. The ore itself is a non-conductor but becomes a good conductor when molten. By lowering the upper graphite electrode into contact with the bottom to make the arc, and then gradually raising the electrode, the fresh ore can be melted and rendered sufficiently clear and fluid.

The magnetite bottom serves to protect the furnace lining from the direct heat of the arc, and further serves as a protective layer for the steel bottom contact, preventing corrosion at that point.

In order to prevent penetration of the magnetite bottom by the arc, which has been found to melt principally downward with very little lateral fusion, broken anode scrap is added to the ore charge. This scrap, when added to the bath, is but slowly absorbed, the raw ore going into solution much more readily. Where raw ore is added from time to time, the scrap settles to the bottom of the bath and remains practically unattacked. Overheating and penetration of the bottom is thus avoided.

The furnace itself is constructed of material not attacked by the magnetite. It may thus be provided with a magnesite lining, and with a silica brick roof. There is a tendency of the roof material to slag with the ore when the latter is accidentally brought in contact with it, but this can readily be avoided. The magnesite lining, being itself of a basic nature, is not attacked by the magnetite.

In melting the ore and forming the molten magnetite, using such a furnace as that above described having a magnetite bottom, the graphite electrode is first lowered into contact with the magnetite bottom and a suitable charge of ore (e. g. "purple ore" or leached Rio Tinto cinder) is thrown in around the electrode, which is gradually raised as fast as the ore near the arc is melted and becomes conducting. At the same time, the outlying portions of the charge around the periphery of the hearth are gradually poled down into the zone of fusion.

When a clear fluid bath of sufficient quantity has accumulated, a still further small portion of ore is thrown on the surface and as soon as this has been absorbed the bath is ready to pour. This final addition serves both as a temperature check and to limit the formation of an excess of ferrous oxid. The whole melting operation, as described, requires about one to one and a half hours. The molten magnetite, when ready for pouring, is at a temperature of about 1590° C.

For casting the hollow electrodes it has been found advantageous to use a cast gray iron mold, split diagonally along its major axis. By careful foundry work the interior surface can be made sufficiently smooth to eliminate all machine work except at the joint planes. This natural surface presents several points of advantage over a machined surface, being more resistant to the molten magnetite, and having less tendency to warp, as well as being less expensive to produce. The two halves of the mold are drawn together during casting by pivoted bolts and keys, this method of fastening having been found to afford an expeditious means of stripping.

For convenience in handling, the mold is mounted on trunnions, to permit of its rotation in a vertical plane, and is carried by a suitable conveyer such as an overhead trolley and chain-block having a supporting yoke in which the trunnions are mounted.

A pouring funnel or top, forming an extension of the mold, is arranged thereon, and is connected to the supporting yoke so that it will be removed when the mold is inverted, for purposes which will presently appear.

A mold, such as described, is illustrated in the accompanying drawing, this mold being of a size and construction which has been found in practice to give good results, but it will be understood that it may be varied in size and proportions, as well as in details of construction, without departing from the spirit and scope of the invention.

In the accompanying drawings,—

Fig. 6 is a sectional view of the detachable top or extension; and

Fig. 7 shows the mold in an upright position, supported in the yoke, and with the top extension thereon.

Figure 1:
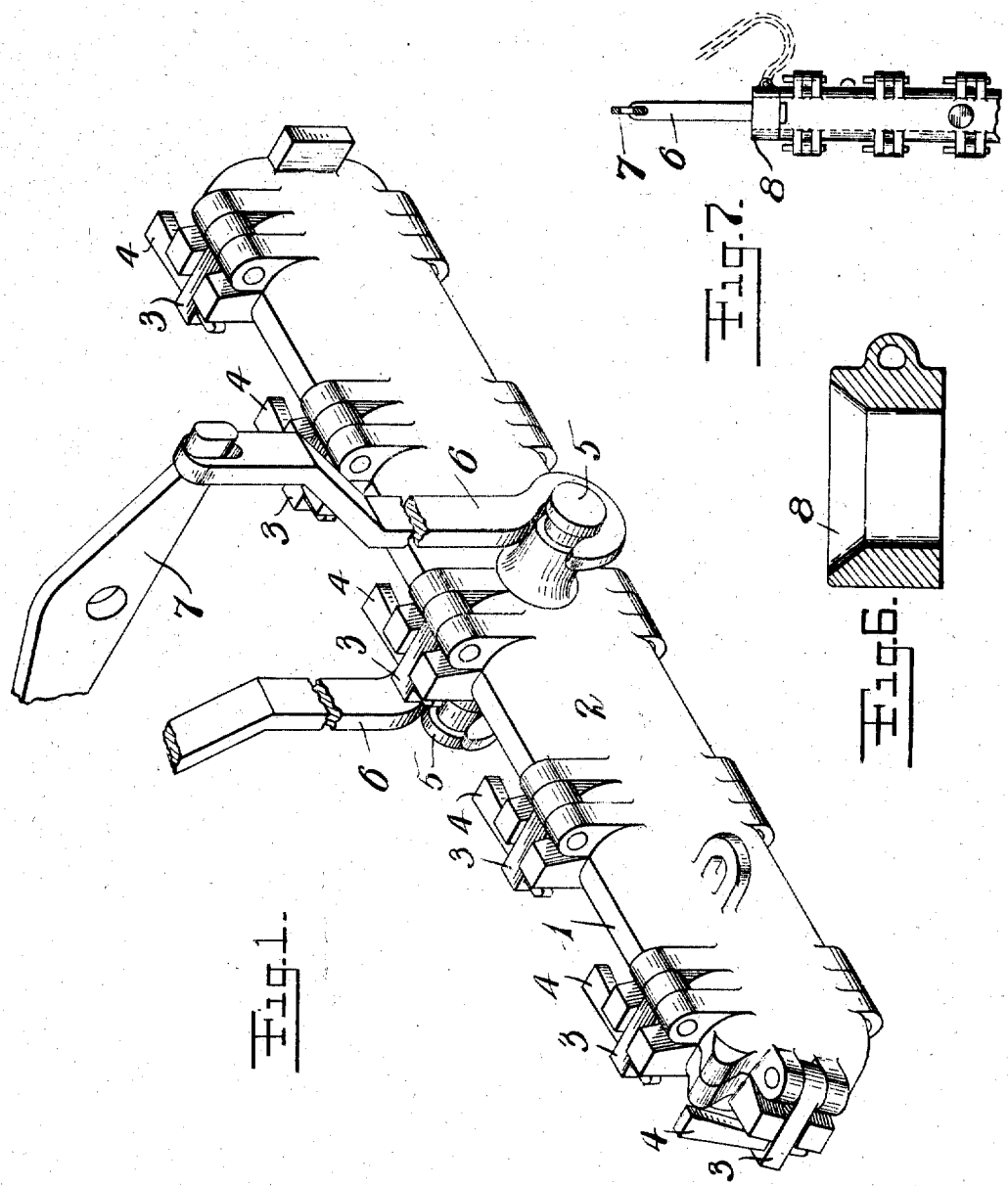
Figure 1 shows the mold in perspective, and in a horizontal position, supported by the yoke, parts of which have been broken away.
Figure 2:
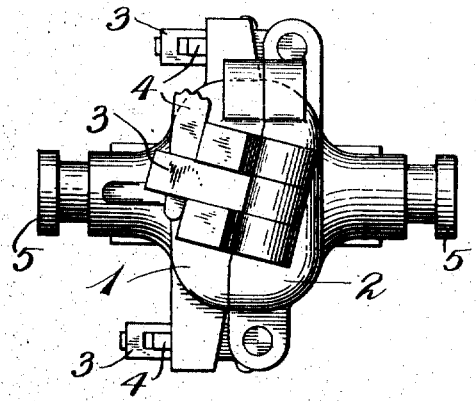
Figs. 2 and 3 are respectively bottom and top views of the mold.
Figure 3:
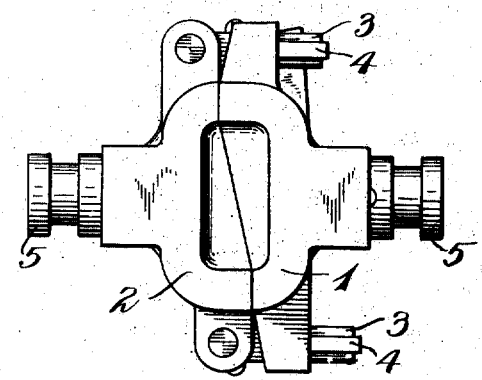
Figure 4:
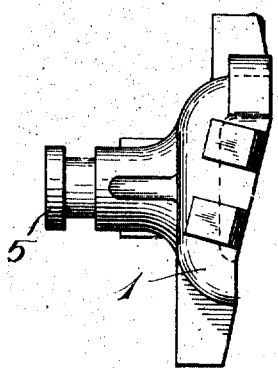
Figs. 4 and 5 show the parts of the mold separated.
Figure 5:
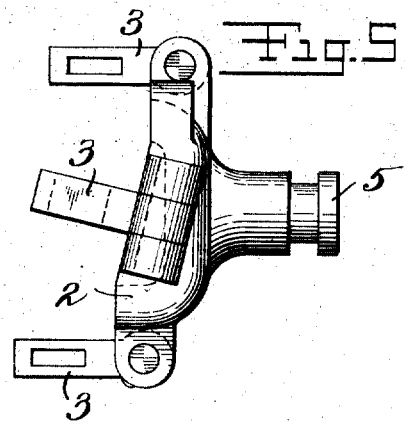

The mold, as shown, is made up of the two parts 1 and 2, held together by pivoted bolts 3 and keys 4. The mold is supported by trunnions 5 in a yoke made up of an upper frame member 7 and hook members 6. The detachable top is indicated at 8. Such a mold forms the subject-matter of my co-pending application, Serial No. 75,477, filed February 1, 1916.

Before casting, the mold must be heated to approximately 350° C. It is important that this temperature be carefully approximated. Below this temperature, the chilling effect upon the electrode is great, and the electrode is liable to crack during annealing. Above this temperature, the anode has a strong tendency to adhere to the mold, with resulting danger of rupture in stripping and failure during annealing. It has been found, however, that it is safer practice to run the mold on the hot side and run the risk of moderate sticking.

To reduce any tendency to stick at temperatures slightly above the normal, the mold may be given a coating of lime with an air brush immediately after each casting and before the mold is returned to the heating furnace to be again heated. Bone ash, and other suitable materials, can be used in a similar manner.

In carrying out the casting operation, the molten magnetite, at the appropriate temperature (about 1590° C.), is poured directly into the preheated mold. As soon as the mold is filled, it is allowed to stand undisturbed for one minute, at the end of which period it is quickly inverted to discharge the still molten interior. This leaves a shell of solid magnetite of the desired thickness (approximately ¼ inch thick) on the inner surface of the mold.

The mold is then quickly laid in a horizontal position on a stripping table. The keys are knocked out and the upper half of the mold lifted off. An iron spatula (in the form of an elongated loop) previously heated to redness, is then thrust into the anode, which is lifted from the lower half of the mold and conveyed to the annealing shelf. The temperature of the anode at this point is about 1100 to 1200° C.

The anode is next annealed by burying in a bed of pulverulent non-conducting material, such as kieselguhr. This may with advantage be done in a series of horizontal superimposed shelves about 20 inches apart, each of which is covered with a bed of the material 12 to 14 inches deep. This material should be thoroughly dried and preferably preheated to about 100° C. The stripped anode is laid on the shelf and buried in the material.

The cooling and annealing of the anodes take place slowly, under these conditions, the anodes remaining undisturbed for a sufficient period of time to permit cooling to a safe temperature for removal and handling. This period is, in practice, about four days.

In casting the anodes in an open mold it was found difficult to obtain an anode with a perfect neck. In the one minute interval allowed for the anode wall to form, a thick skin formed over the top of the magnetite, which had to be broken through before the interior magnetite could be discharged. This left a ragged membrane at the mouth of the anode which could not be removed without cutting off the entire neck.

If, during the one minute period, the neck is kept open by agitation of the molten interior with a bar, the anode wall is rapidly chilled at this point. Heavy strains are thus set up, often causing the anodes to fail during annealing.

This difficulty, however, has been overcome by the use of a hot top or funnel, of suitable form. This top rests upon the top of the mold during pouring, and forms in effect an extension of the mold. As indicated in Fig. 7 it is connected by a chain to the top of the yoke in which the mold rotates, so that when the mold is inverted the hot top is removed automatically with a shearing effect. A neck is thus formed which is substantially perfect in every respect, and free from warts, obstructions, and other defects. Moreover, since the anode is still plastic when the hot top is removed, no strains are set up such as might have a deleterious effect on it in its later life.

What I claim is:—

1. The method of casting hollow magnetite electrodes, which comprises pouring the molten magnetite into molds heated to about 350° C., allowing the mold to stand undisturbed until a shell of solid magnetite has been formed, and pouring the still molten magnetite from the mold; substantially as described.

2. The method of forming hollow magnetite electrodes, which comprises pouring the molten magnetite at a temperature of about 1590° C. into molds heated to about 350° C., allowing the mold to stand undisturbed for about one minute, pouring the still molten magnetite from the mold, stripping the hollow magnetite electrode from the mold at a temperature of about 1100° to 1200° C., and slowly annealing the resulting electrode; substantially as described.

3. The method of forming hollow magnetite electrodes, which comprises pouring the molten magnetite at a temperature of about 1590° C. into molds heated to about 350° C., allowing the mold to stand undisturbed for about one minute, pouring the still molten magnetite from the mold, stripping the hollow magnetite electrode from the mold at a temperature of about 1100° to 1200° C., and slowly annealing the resulting electrode by burying the same in a pulverulent non-conducting material for a sufficient period of time to permit the desired cooling to take place; substantially as described.

4. The method of casting hollow magnetite electrodes, which comprises pouring the molten magnetite into a heated mold provided with a heated removable top forming an extension thereof, allowing the mold to stand undisturbed until a shell of solid magnetite has been formed in the mold and removable top, and subsequently removing said top and the shell formed therein and pouring the still molten magnetite from the mold; substantially as described.

5. The method of casting hollow magnetite electrodes, which comprises pouring the molten magnetite into a heated mold provided with a heated removable top forming an extension thereof, allowing the mold to stand undisturbed until a shell of solid magnetite has been formed in the mold and removable top, inverting said mold and pouring the still molten magnetite therefrom, and automatically removing said top with a shearing effect during the inversion of said mold; substantially as described.

6. The method of casting magnetite electrodes, which comprises pouring the molten magnetite into molds preheated to about 350° C., whereby a shell of solid magnetite is formed within the mold while the interior of the body of magnetite remains molten; substantially as described.

7. The method of casting magnetite electrodes, which comprises pouring the molten magnetite at a temperature of about 1590° C. into molds preheated to about 350° C., whereby a shell of solid magnetite is formed within the mold while the interior of the body of magnetite remains molten; substantially as described.

8. The method of forming magnetite electrodes, which comprises pouring molten magnetite into molds heated to about 350° C., stripping the magnetite while still at a high temperature, and slowly annealing the resulting electrode by burying the same in a pulverulent non-conducting material for a sufficient period of time to permit the desired cooling to the take place; substantially as described.

9. The method of casting magnetite electrodes, which comprises pouring the molten magnetite into a heated mold provided with a heated removable top forming an extension thereof, allowing the mold to stand until a shell of solid magnetite has been formed in the mold and removable top, and subsequently removing said top and the shell formed therein with a shearing action, whereby the shell remaining in the mold is provided with a top of uniform thickness; substantially as described.

In testimony whereof I affix my signature.

ARTHUR P. SCOTT.